US011893889B2

(12) United States Patent
Noguchi et al.

(10) Patent No.: US 11,893,889 B2
(45) Date of Patent: Feb. 6, 2024

(54) TRAVEL ASSISTANCE SYSTEM, TRAVEL ASSISTANCE METHOD, AND NON-TRANSITORY COMPUTER-READABLE STORAGE MEDIUM THAT STORES PROGRAM

(71) Applicant: HONDA MOTOR CO., LTD., Tokyo (JP)

(72) Inventors: Takuma Noguchi, Tokyo (JP); Keiichi Mizumura, Tokyo (JP); Yuji Kurasawa, Tokyo (JP); Gakushi Fukuda, Tokyo (JP); Go Nakamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/192,997

(22) Filed: Mar. 5, 2021

(65) Prior Publication Data

US 2021/0300399 A1 Sep. 30, 2021

(30) Foreign Application Priority Data

Mar. 27, 2020 (JP) ................................ 2020-058227

(51) Int. Cl.
*G08G 1/16* (2006.01)
*B60W 50/14* (2020.01)
(Continued)

(52) U.S. Cl.
CPC ........... *G08G 1/16* (2013.01); *B60W 30/0956* (2013.01); *B60W 50/14* (2013.01); *G08G 1/167* (2013.01);
(Continued)

(58) Field of Classification Search
CPC .. G08G 1/00; G08G 1/07; G08G 1/14; G08G 1/143; G08G 1/16; G08G 1/165;
(Continued)

(56) References Cited

U.S. PATENT DOCUMENTS 8,368,755 B2 2/2013 Nishida et al.
8,872,919 B2 10/2014 Watanabe et al.
(Continued)

FOREIGN PATENT DOCUMENTS

DE 10251039 A1 5/2004
DE 112014006827 T5 4/2017
(Continued)

OTHER PUBLICATIONS

NPL Search (Mar. 14, 2022).*
(Continued)

*Primary Examiner* — Van T Trieu
(74) *Attorney, Agent, or Firm* — Thomas| Horstemeyer, LLP

(57) ABSTRACT

A travel assistance system including a server that assists traveling of a vehicle, comprises: a recognition unit configured to recognize an obstruction factor for traveling of the vehicle; an obtainment unit configured to obtain information of an approaching vehicle that approaches the obstruction factor; a generation unit configured to, based on information of the obstruction factor recognized by the recognition unit, generate warning information corresponding to information of a type of the approaching vehicle obtained by the obtainment unit; a transmission unit configured to transmit the warning information to the approaching vehicle; and a control unit configured to give notification to an occupant of the approaching vehicle and/or control traveling of the approaching vehicle based on the warning information.

8 Claims, 12 Drawing Sheets

(51) Int. Cl.
  *B60W 30/095* (2012.01)
  *H04W 4/46* (2018.01)
(52) U.S. Cl.
  CPC ........ *H04W 4/46* (2018.02); *B60W 2050/143* (2013.01); *B60W 2050/146* (2013.01); *B60W 2554/4026* (2020.02); *B60W 2556/65* (2020.02)
(58) Field of Classification Search
  CPC .......... G08G 1/166; G08G 1/167; G05D 1/00; G05D 1/0027; G05D 1/0088; G05D 1/0212; G06K 9/00; G06K 9/00812; G06K 9/00825; G07C 9/00; G07C 9/00158; B60R 16/00; B60R 16/037; B60R 16/0373; B60R 25/00; B60W 30/06; B60W 30/09; B60W 30/095; B60W 50/14
  See application file for complete search history.

(56) References Cited

U.S. PATENT DOCUMENTS

| | | | | |
|---|---|---|---|---|
| 9,679,487 | B1* | 6/2017 | Hayward | G08G 1/012 |
| 9,841,762 | B2* | 12/2017 | Moran | B60W 30/085 |
| 10,281,914 | B2* | 5/2019 | Moran | G05D 1/0055 |
| 11,634,137 | B2* | 4/2023 | Buburuzan | B60W 30/18109 |
| | | | | 701/70 |
| 2006/0031015 | A1* | 2/2006 | Paradie | G06T 7/70 |
| | | | | 340/436 |
| 2006/0192660 | A1 | 8/2006 | Watanabe et al. | |
| 2007/0139523 | A1 | 6/2007 | Nishida et al. | |
| 2011/0169955 | A1 | 7/2011 | Watanabe et al. | |
| 2017/0186318 | A1 | 6/2017 | Murayama et al. | |
| 2017/0248950 | A1* | 8/2017 | Moran | G05D 1/0022 |
| 2019/0135306 | A1* | 5/2019 | Won | G08G 1/166 |
| 2021/0118301 | A1* | 4/2021 | Mondragon | G08G 1/0112 |
| 2021/0237734 | A1* | 8/2021 | Buburuzan | G06V 20/56 |

FOREIGN PATENT DOCUMENTS

| | | |
|---|---|---|
| DE | 102016209552 A1 | 12/2017 |
| DE | 102017215553 A1 | 3/2019 |
| JP | 2006-252389 A | 9/2006 |
| JP | 2006323666 A * | 11/2006 |
| JP | 2007-164549 A | 6/2007 |
| JP | 2018-105967 A | 7/2018 |
| WO | 2008/075407 A1 | 6/2008 |
| WO | 2016013040 A1 | 1/2016 |
| WO | 2017207154 A1 | 12/2017 |
| WO | 2019048130 A1 | 3/2019 |

OTHER PUBLICATIONS

Japanese Office Action for Japanese Patent Application No. 2020-058227 dated Oct. 29, 2021 (partially translated).
Japanese Office Action for Japanese Patent Application No. 2020-058227 dated May 20, 2022 (partially translated).
German Office Action for German Patent Application No. 102021107316.2 dated Sep. 19, 2022 (partially translated).
Search Report for German Patent Application No. 102021107316.2 dated Sep. 19, 2022 (partially translated).

* cited by examiner

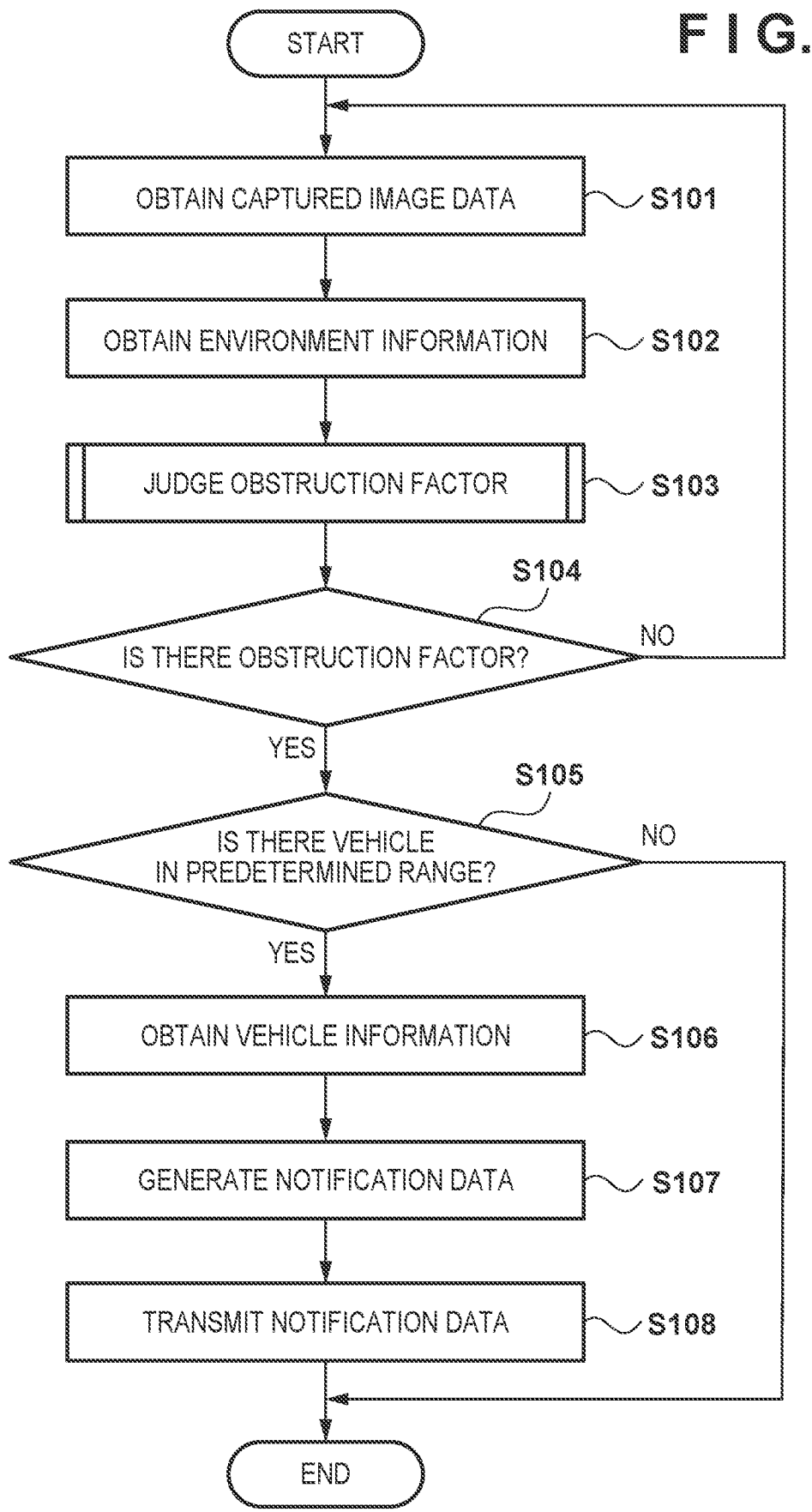

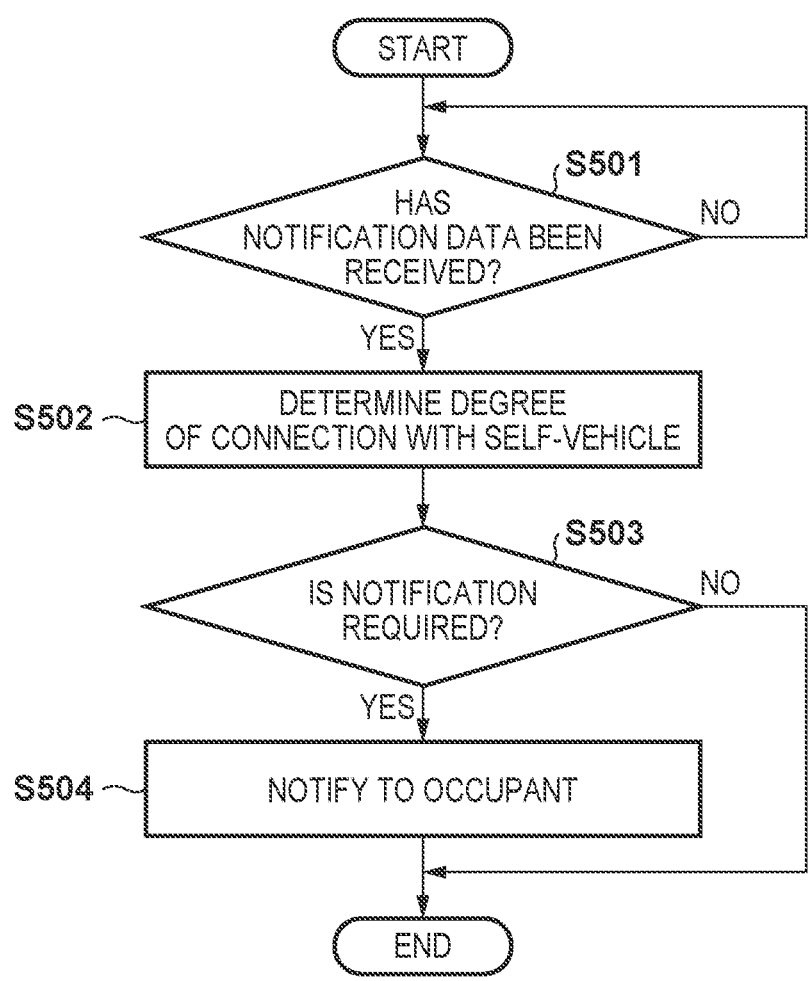

TRAVEL ASSISTANCE SYSTEM, TRAVEL ASSISTANCE METHOD, AND NON-TRANSITORY COMPUTER-READABLE STORAGE MEDIUM THAT STORES PROGRAM

CROSS-REFERENCE TO RELATED APPLICATION(S)

This application claims priority to and the benefit of Japanese Patent Application No. 2020-058227 filed on Mar. 27, 2020, the entire disclosure of which is incorporated herein by reference.

BACKGROUND OF THE INVENTION

Field of the Invention

The present invention relates to a travel assistance system that assists traveling, a travel assistance method, and a non-transitory computer-readable storage medium that stores a program.

Description of the Related Art

Japanese Patent Laid-Open No. 2007-164549 describes that a camera capable of capturing an image of a region of a blind spot for a driver under optimal conditions is selected by constantly detecting the positions, directions, viewing angles, and moving speeds of cameras mounted on other cars that are currently traveling around a self-vehicle. According to this technique, a travel environment can be detected by a camera capable of capturing an image under optimal conditions.

SUMMARY OF THE INVENTION

The present invention provides a travel assistance system that appropriately gives notification of information of an obstruction, a travel assistance method, and a non-transitory computer-readable storage medium that stores a program.

The present invention in its first aspect provides a travel assistance system including a server that assists traveling of a vehicle, the travel assistance system including: a recognition unit configured to recognize an obstruction factor for traveling of the vehicle; an obtainment unit configured to obtain information of an approaching vehicle that approaches the obstruction factor; a generation unit configured to, based on information of the obstruction factor recognized by the recognition unit, generate warning information corresponding to information of a type of the approaching vehicle obtained by the obtainment unit; a transmission unit configured to transmit the warning information to the approaching vehicle; and a control unit configured to give notification to an occupant of the approaching vehicle and/or control traveling of the approaching vehicle based on the warning information.

The present invention in its second aspect provides a travel assistance method executed by a travel assistance system including a server that assists traveling of a vehicle, the travel assistance method including: recognizing an obstruction factor for traveling of the vehicle; obtaining information of an approaching vehicle that approaches the obstruction factor; based on information of the recognized obstruction factor, generating warning information corresponding to information of a type of the approaching vehicle obtained in the obtaining; transmitting the warning information to the approaching vehicle; and giving notification to an occupant of the approaching vehicle and/or controlling traveling of the approaching vehicle based on the warning information.

The present invention in its third aspect provides a non-transitory computer-readable storage medium that stores a program for causing execution of a computer so as to: recognize an obstruction factor for traveling of a vehicle; obtain information of an approaching vehicle that approaches the obstruction factor; based on information of the recognized obstruction factor, generate warning information corresponding to information of a type of the approaching vehicle obtained in the obtaining; transmit the warning information to the approaching vehicle; and give notification to an occupant of the approaching vehicle and/or control traveling of the approaching vehicle based on the warning information.

According to the present invention, notification of information of an obstruction can be given appropriately.

BRIEF DESCRIPTION OF THE DRAWINGS

FIG. 8 is a flowchart showing processing executed by the server.

FIG. 12 is a flowchart showing notification data generation processing.

DESCRIPTION OF THE EMBODIMENTS

Figure 1:
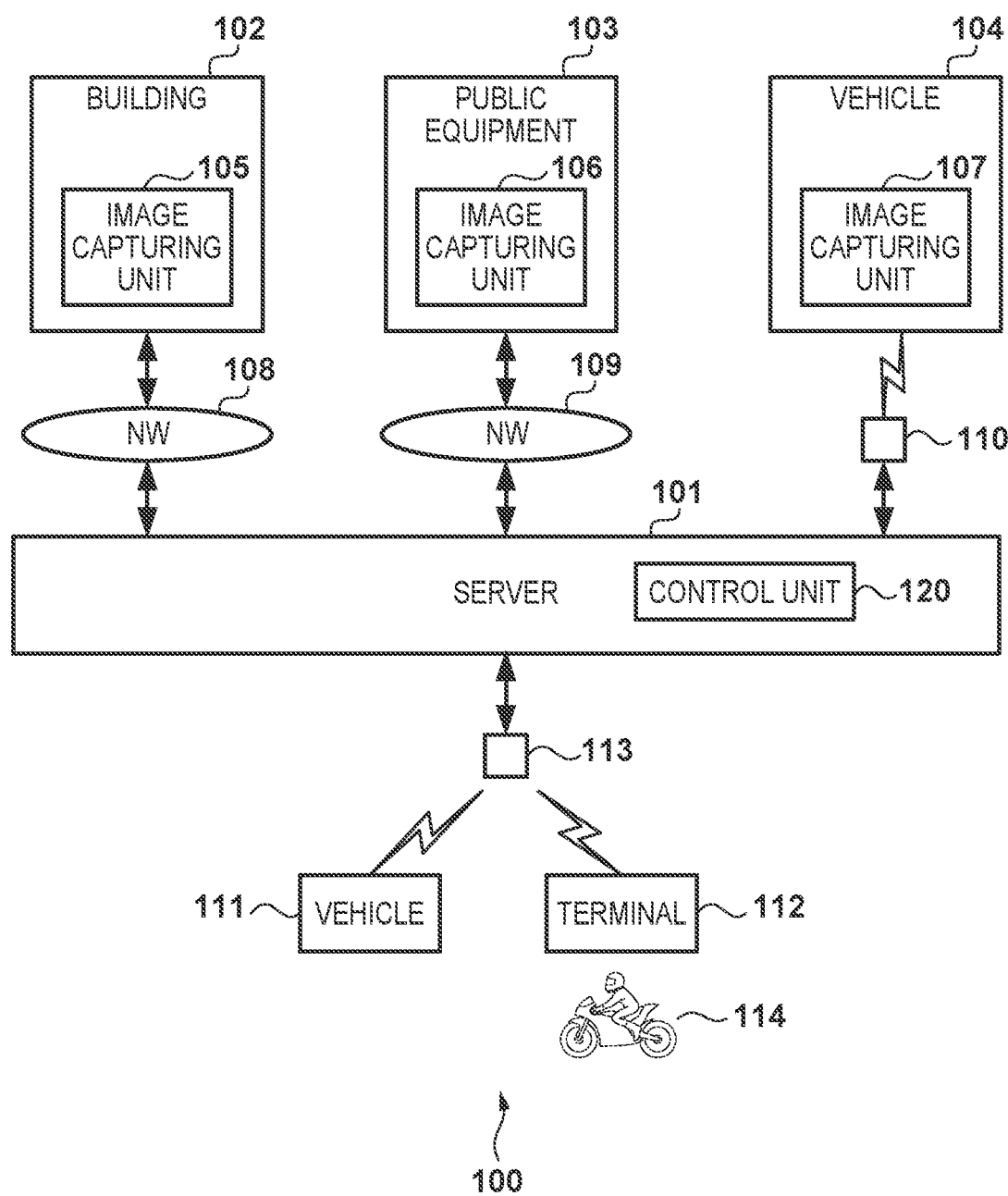
FIG. 1 is a diagram showing a configuration of a travel assistance system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Whether a detected situation can become an obstruction for a vehicle varies depending on that vehicle. For example, there is a case where the detected situation can become an obstruction for a two-wheel vehicle but cannot become an obstruction for a four-wheeled vehicle. Therefore, if notification of the detected situation is given uniformly as obstruction information, a vehicle that has received this obstruction information, for example, recognizes something that is not necessarily an obstruction as an obstruction, that is to say, cannot make an appropriate judgment about an obstruction.

According to an aspect of the present invention, notification of information of an obstruction can be given appropriately.

First Embodiment

FIG. 1 is a diagram showing a configuration of a travel assistance system according to the present embodiment. A travel assistance system 100 includes a server 101 that provides a travel assistance service, and base stations 110, 113 connected to the server 101. The travel assistance system 100 includes vehicles 104, 111; in the present embodiment, the vehicles 104, 111 are four-wheeled vehicles. However, the vehicles 104, 111 are not limited to four-wheeled vehicles, and may be, for example, straddle type vehicles or special-purpose vehicles. The straddle type vehicles may have two wheels or three wheels; in the present embodiment, they are described as straddle type two-wheel vehicles. The travel assistance system 100 also includes a communication system 112. The communication terminal 112 is a communication apparatus that has functions of communicating with the outside, including GPS (Global Positioning System) functions. In the present embodiment, a rider of a straddle type vehicle 114 holds, for example, a smartphone as the communication terminal 112. Also, the communication functions realized by the communication terminal 112 may be included in the straddle type vehicle 114. Although the communication terminal 112 is described as a smartphone in the present embodiment, it may be, for example, another communication apparatus, such as a helmet of the rider of the straddle type vehicle 114. The vehicle 104 can intercommunicate with the server 101 via wireless communication with the base station 110. The vehicle 111 and the communication terminal 112 can intercommunicate with the server 101 via wireless communication with the base station 113. Also, the straddle type vehicle 114 and the communication terminal 112 may be capable of intercommunicating with each other; for example, the straddle type vehicle 114 may be capable of communicating with the server 101 via the communication terminal 112, or the straddle type vehicle 114 may be capable of communicating directly with the server 101.

The present embodiment is based on an assumed case where the vehicles 104, 111 and the straddle type vehicle 114 corresponding to the communication terminal 112 are traveling on a general road on which buildings and public equipment, such as traffic lights and roadside devices, are present. In such a case, for example, various types of obstruction factors for travel can appear, including recesses, projections, and puddles on the road, and moving objects that have a possibility of running into the road, such as bicycles and pedestrians. These obstruction factors may be critical obstruction factors, or may not influence traveling, depending on a vehicle type. For example, puddles, dips, and roadway icing exert a huge influence on straddle type vehicles, but may not influence traveling of four-wheeled vehicles. In the present embodiment, when an obstruction factor has been recognized, a rider is appropriately notified of the obstruction factor in accordance with a vehicle type.

In FIG. 1, a building 102 is a building that is present on, for example, the side of the road, and public equipment 103 is such public equipment as a traffic light and a roadside device. The building 102 and the public equipment 103 include image capturing units 105, 106, such as monitoring cameras, for monitoring a side street of the road. Captured image data captured by the image capturing unit 105 undergoes image processing, and is transmitted to the server 101 via a network (NW) 108. On the other hand, captured image data captured by the image capturing unit 106 undergoes image processing, and is transmitted to the server 101 via a network 109. Also, the vehicle 104 includes an image capturing unit 107, such as a camera, for recognizing an external environment; captured image data captured by the image capturing unit 107 undergoes image processing, and is transmitted to the server 101 via wireless communication with the base station 110.

Figure 7A:
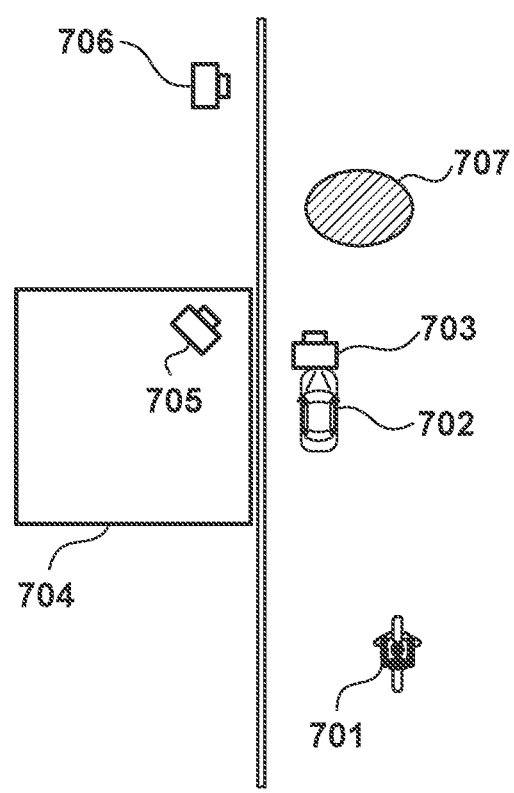
FIG. 7A and FIG. 7B are diagrams showing scenes.
Figure 7B:
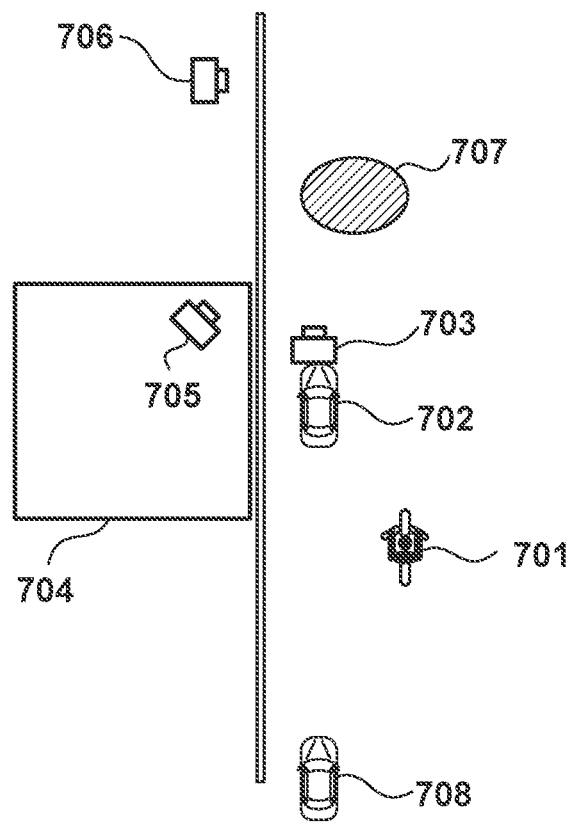

FIGS. 7A and 7B are diagrams showing examples of a scene corresponding to the configurations of FIG. 1 and later-described FIG. 2 and FIG. 3. In FIG. 7A, a vehicle 702 and an image capturing unit 703 are equivalent to the vehicle 104 and the image capturing unit 107 of FIG. 1. Also, a building 704 and an image capturing unit 705 are equivalent to the building 102 and the image capturing unit 105 of FIG. 1. Furthermore, an image capturing unit 706 represents, for example, a camera mounted on a roadside device, and is equivalent to the image capturing unit 106 of the public equipment 103 of FIG. 1. Furthermore, an obstruction factor 707 is, for example, a dip on the road. Furthermore, a vehicle 701 is a straddle type vehicle, and a communication apparatus that is held by a rider thereof or attached to the vehicle 701 is equivalent to the communication terminal 112 of FIG. 1. FIG. 7B shows a scene in which a vehicle 708 is further traveling behind the vehicle 701; the vehicle 708 is equivalent to the vehicle 111 of FIG. 1.

Figure 2:
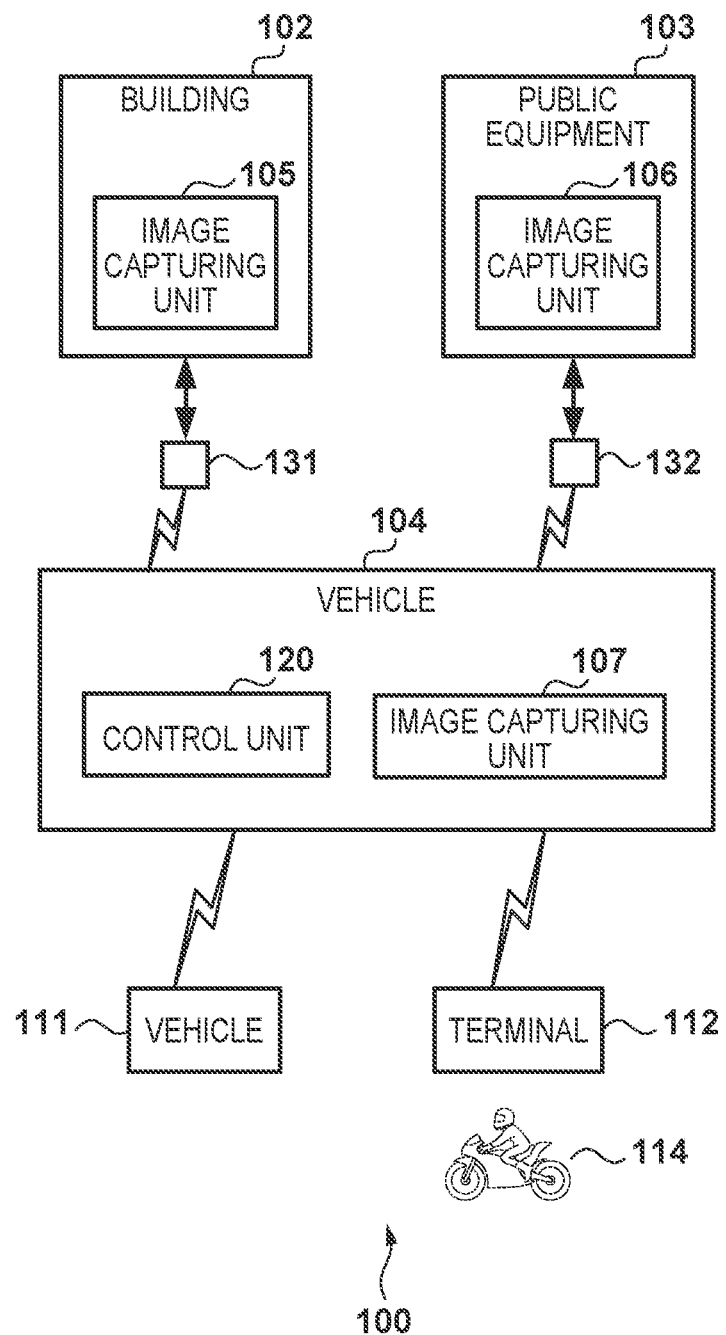
FIG. 2 is a diagram showing another configuration of the travel assistance system.

FIG. 2 is a diagram showing another configuration of the travel assistance system 100. FIG. 2 differs from FIG. 1 in that a constituent equivalent to the server 101 is absent. In FIG. 2, captured image data captured by the image capturing unit 105 of the building 102 is transmitted to the vehicle 104 via a base station 131. Also, captured image data captured by the image capturing unit 106 of the public equipment 103 is transmitted to the vehicle 104 via a base station 132. When an obstruction factor has been recognized from these pieces of captured image data or captured image data captured by the image capturing unit 107 of the vehicle 104, a control unit 120 of the vehicle 104 transmits information of the obstruction factor to the vehicle 111 and the communication terminal 112.

Figure 3:
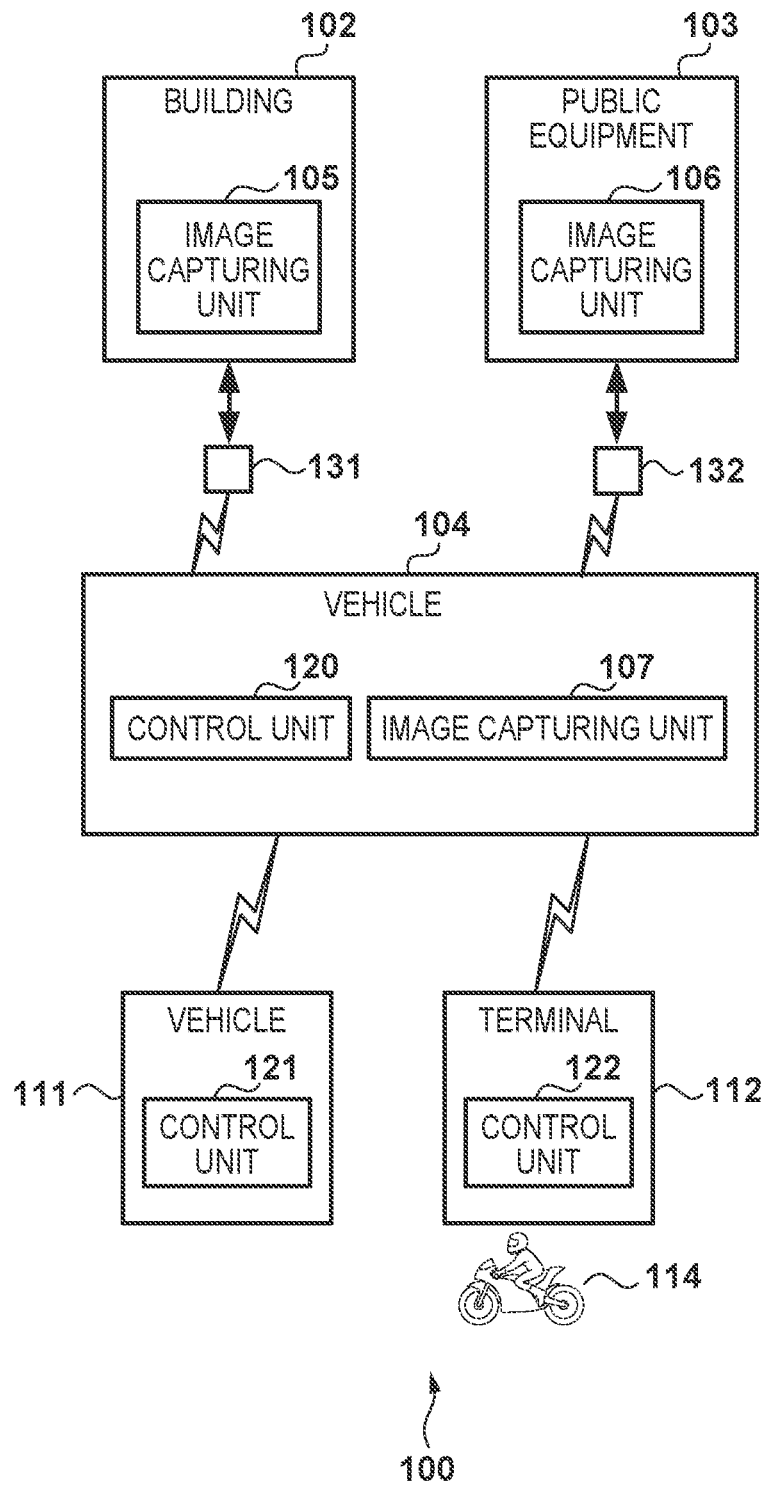
FIG. 3 is a diagram showing still another configuration of the travel assistance system.

FIG. 3 is a diagram showing still another configuration of the travel assistance system 100. FIG. 3 differs from FIG. 2 in that control units 121, 122 are configured in the vehicle 111 and the terminal 112. The control units 121, 122 are computer systems that include a processor and a memory; the control unit is a controller including, for example, an ECU in the case of the vehicle, and is a controller including, for example, a CPU in the case of the communication terminal 112. In FIG. 3, the control unit 121 of the vehicle 111 and the control unit 122 of the communication terminal 112 make a determination about the connection between information of an obstruction factor transmitted from the vehicle 104 and the self-vehicle, and give notification to occupants based on the result of this determination. The operations for giving notification based on the determination about the connection will be described in a third embodiment.

Figure 4:
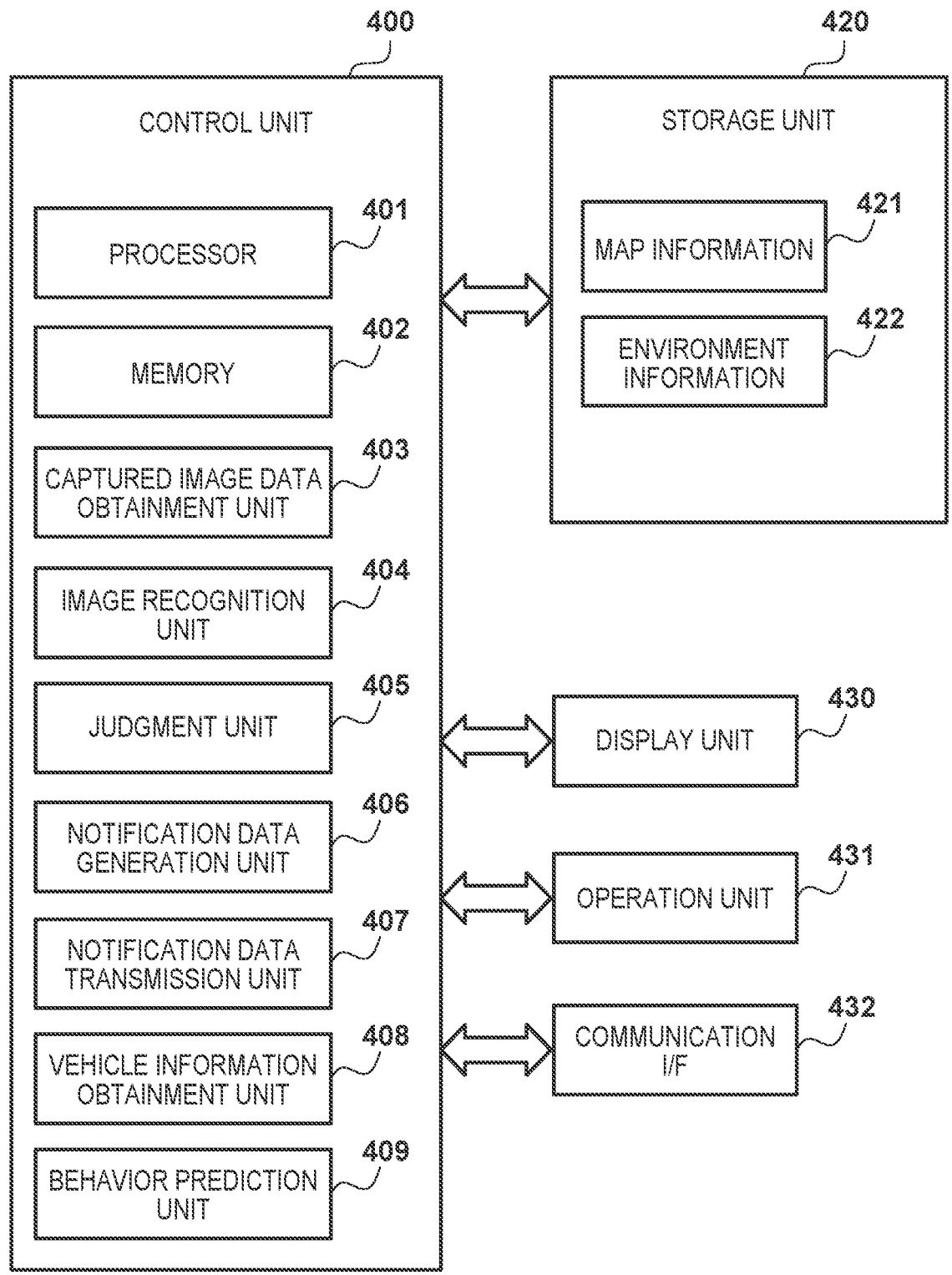
FIG. 4 is a diagram showing a block configuration of a server.

FIG. 4 is a diagram showing a block configuration of the server 101. A control unit 400 integrally controls the server 101. The control unit 400 is a computer system that includes a processor 401, such as a CPU and a GPU, for integrally controlling the operations inside the control unit 400, a memory 402, a captured image data obtainment unit 403, an image recognition unit 404, a judgment unit 405, a notification data generation unit 406, a notification data transmission unit 407, a vehicle information obtainment unit 408, and a behavior prediction unit 409. The operations of the server 101 according to the present embodiment are realized by, for example, the processor 401 executing a program on the memory 402. The captured image data obtainment unit 403 receives captured image data transmitted from the building 102, the public equipment 103, and the vehicle 104. In the present embodiment, this captured image data includes, for example, a captured image of a dip on the road as an obstruction factor. The image recognition unit 404 recognizes an object in the captured image data obtained by the captured image data obtainment unit 403 with use of, for example, a technique of class categorization and the like.

The judgment unit 405 judges whether there is an obstruction factor for traveling of vehicles based on the result of recognition of the image recognition unit 404. Obstruction factor judgment processing will be described later. The notification data generation unit 406 generates notification data to be transmitted to the vehicle 111 and the communication terminal 112. The notification data transmission unit 407 transmits the notification data generated by the notification data generation unit 406 to the vehicle 111 and the communication terminal 112. The vehicle information obtainment unit 408 obtains vehicle information transmitted from the vehicle 111 and the communication terminal 112. The vehicle information includes, for example, GPS information obtained by each vehicle. Also, the vehicle information obtainment unit 408 can obtain such vehicle information as vehicle models of vehicles that have been registered in advance, via an application, by the occupant of the vehicle 111 and the holder of the communication terminal 112. The behavior prediction unit 409 predicts a course via which a vehicle to which the notification data is to be transmitted avoids an obstruction factor. The operations of the behavior prediction unit 409 will be described in the third embodiment.

A storage unit 420 stores a program and data for the operations of the server 101, and a program and data necessary for the operations of the present embodiment. The storage unit 420 also stores map information 421 and environment information 422. The map information 421 is, for example, a map database, whereas the environment information 422 is, for example, a weather information database or a road surface information database. Note that the map information 421 and the environment information 422 may not be configured inside the storage unit 420, and may be obtained from an external database server. The storage unit 420 may store other information; for example, it may store information by which user information and vehicle information (e.g., GPS information and a vehicle model) of the communication terminal 112 are associated with each other.

A display unit 430 is, for example, a display, and displays various types of user interface screens for a user of the server 101. An operation unit 431 can accept operations from the user, and is, for example, a keyboard or a pointing device. A communication interface (I/F) 432 enables communication with the base stations 110, 113 and the networks 108, 109. The server 101 is not limited to the block configuration shown in FIG. 4, and includes, for example, functional blocks corresponding to the functions of the server 101 as appropriate. Note, although the server 101 is illustrated as one apparatus in FIG. 4, it may be composed of a plurality of apparatuses. That is to say, the server 101 according to the present embodiment includes a configuration that provides server functions using one apparatus, and a configuration that provides server functions through coordination among a plurality of apparatuses.

Figure 5:
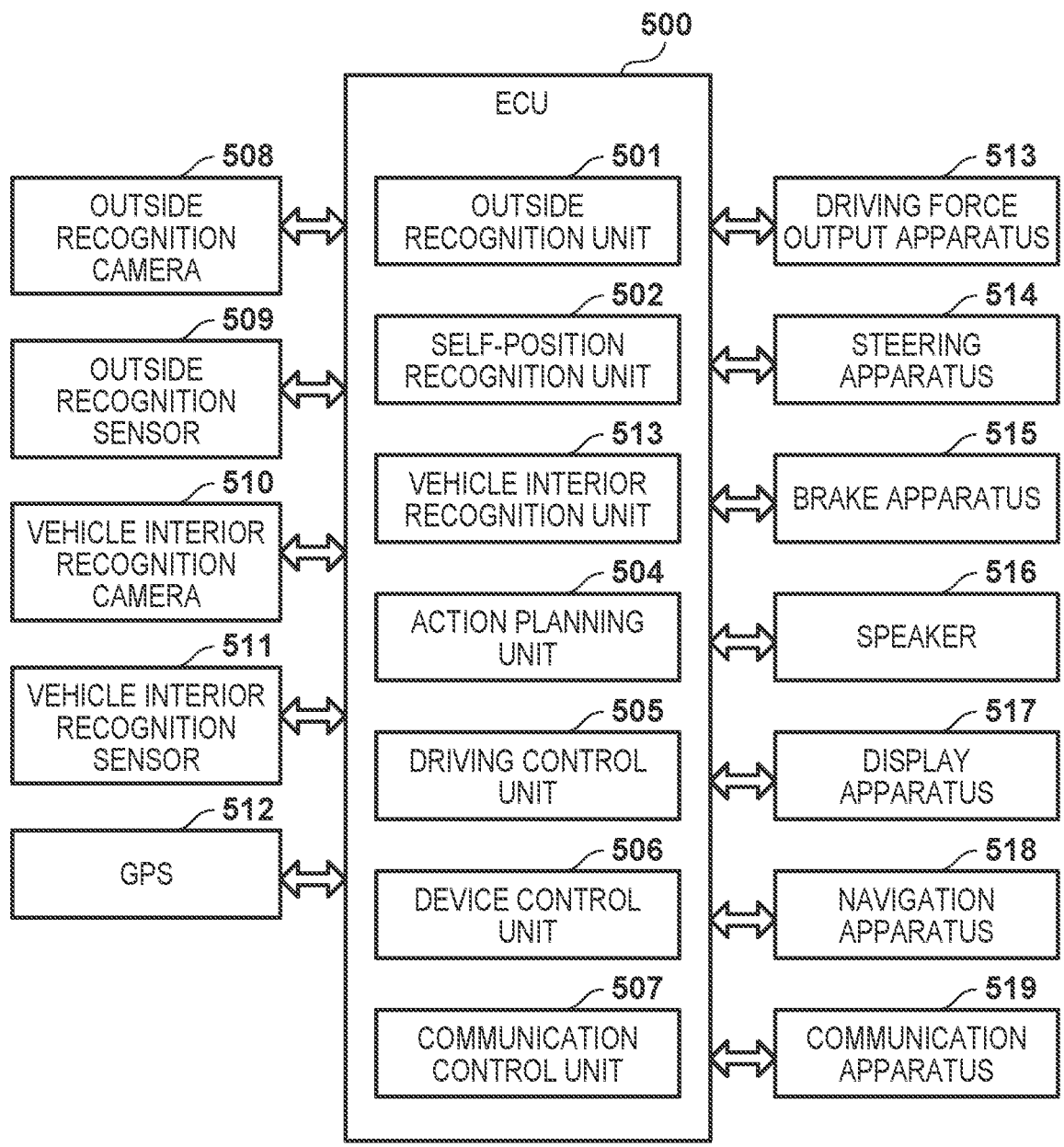
FIG. 5 is a diagram showing a block configuration of a vehicle.

FIG. 5 is a diagram showing a block configuration of the vehicle 104 and the vehicle 111. Hereinafter, the vehicle 104 will be described as a representative example of the vehicle 104 and the vehicle 111. A control unit 500 includes an outside recognition unit 501, a self-position recognition unit 502, a vehicle interior recognition unit 503, an action planning unit 504, a driving control unit 505, a device control unit 506, and a communication control unit 507. Each block is realized by one ECU or a plurality of ECUs.

The outside recognition unit 501 recognizes outside information of the vehicle 104 based on signals from an outside recognition camera 508 and an outside recognition sensor 509. The outside recognition camera 508 is equivalent to the image capturing unit 107 of the vehicle 104 of FIG. 1. The outside recognition unit 501 recognizes, for example, such scenes as intersections, level crossings, and tunnels, such free spaces as shoulders, and behaviors (e.g., speeds and traveling directions) of other vehicles based on signals from the outside recognition camera 508 and the outside recognition sensor 509. The self-position recognition unit 502 recognizes the current position of the vehicle 104 based on signals from a GPS 512.

The vehicle interior recognition unit 503 identifies an occupant of the vehicle 104 and recognizes the state of the occupant based on signals from a vehicle interior recognition camera 510 and a vehicle interior recognition sensor 511. The vehicle interior recognition camera 510 is, for example, a near-infrared camera mounted on a display apparatus 517 inside the vehicle 104, and detects, for example, the direction of the line of sight of the occupant. Also, the vehicle interior recognition sensor 511 is a sensor that detects, for example, biometric signals of the occupant. Based on these signals, the vehicle interior recognition unit 503 recognizes a state where the occupant is falling asleep, a state where the occupant is currently working on something other than driving, and so forth.

The action planning unit 504 plans actions of the vehicle 104, such as an optimal course and a risk avoidance course, based on the results of recognition by the outside recognition unit 501 and the self-position recognition unit 502. The action planning unit 504 makes an entrance judgment based on, for example, start points and end points of an intersection, a level crossing, and so forth, and makes action plans based on the result of prediction of behaviors of other vehicles. The driving control unit 505 controls a driving force output apparatus 513, a steering apparatus 514, and a brake apparatus 515 based on the action plans made by the action planning unit 504.

The device control unit 506 controls devices connected to the control unit 500. For example, the device control unit 506 causes a speaker 516 to output predetermined audio messages, such as messages for warning and navigation, by controlling the speaker 516. Also, for example, the device control unit 506 causes the display apparatus 517 to display predetermined interface screens by controlling the display apparatus 517. Furthermore, for example, the device control unit 506 obtains setting information in a navigation apparatus 518 by controlling the navigation apparatus 518. The communication control unit 507 can communicate with the outside via a communication apparatus 519, and can, for example, receive information from communication apparatuses of other vehicles.

The control unit 500 may include functional blocks other than those shown in FIG. 5 as appropriate, and may include, for example, an optimal course calculation unit that calculates an optimal course to a destination based on map information obtained via the communication apparatus 519. Also, the control unit 500 can receive detection signals not only from the GPS 512, but also from various types of sensors mounted on the vehicle 104. For example, the control unit 500 receives detection signals of a door open/close sensor and a door lock mechanism sensor mounted on a door unit of the vehicle 104 via an ECU configured in the door unit. In this way, the control unit 500 can detect unlocking of a door and an operation of opening/closing a door.

Figure 6A:
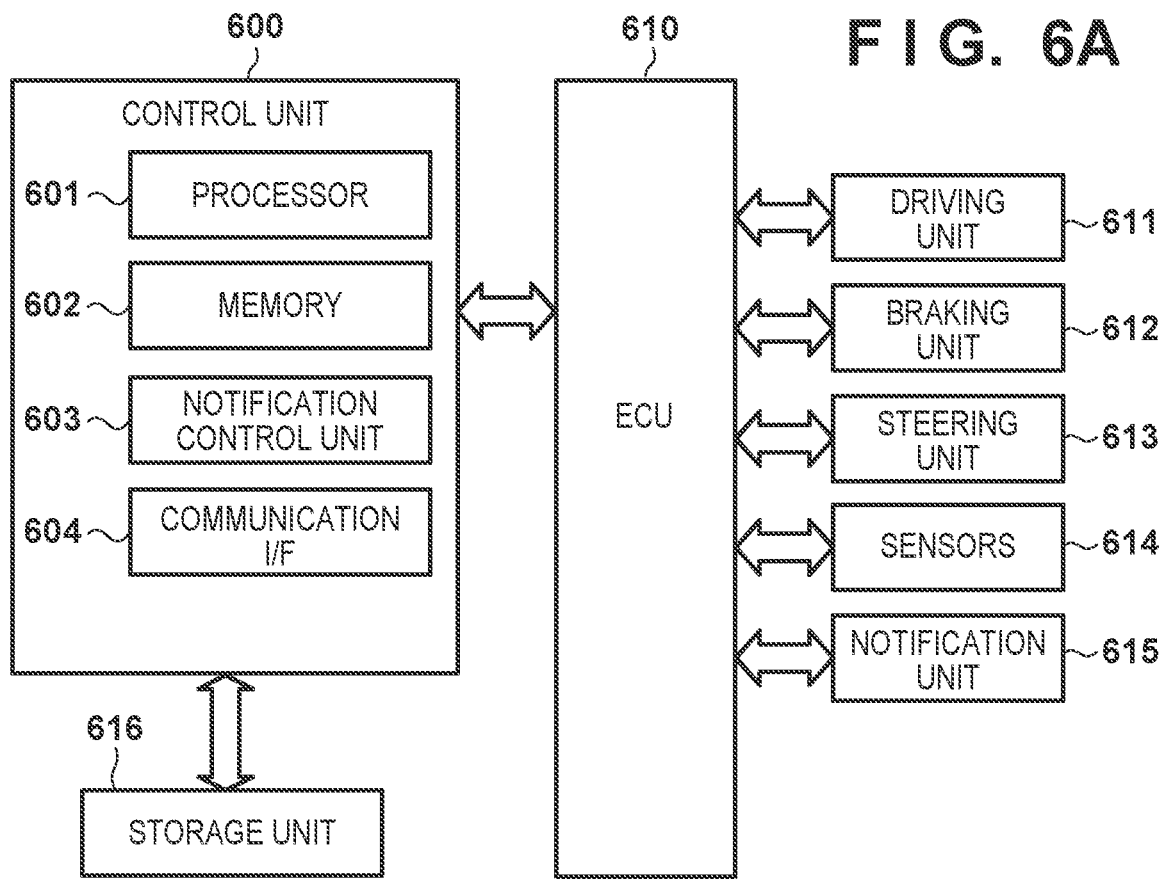
FIG. 6A and FIG. 6B are diagrams showing block configurations of a straddle type vehicle.

FIG. 6A is a diagram showing a block configuration of the straddle type vehicle 114 corresponding to the communication terminal 112. An ECU (Electronic Control Unit) 610 integrally controls respective components of the straddle type vehicle 114. The straddle type vehicle 114 is configured in such a manner that travel control is performed using, for example, a throttle-by-wire method, and the ECU 610 controls a driving unit 611, which includes an engine, by opening/closing a throttle valve upon receiving an electrical signal related to a degree of opening of an accelerator pedal in a steering unit 613. A braking unit 612 includes a brake mechanism. A sensor group 614 includes various types of sensors, such as a speed sensor, a throttle sensor, and an atmospheric pressure sensor, and the ECU 610 receives detection signals thereof. A notification unit 615 is a lighting mechanism that includes a lamp, an LED, and the like, and displays, for example, the direction (left, right, etc.) in which an obstruction factor is present.

A control unit 600 is a block capable of executing wireless communication with the communication terminal 112 via a communication interface (I/F) 604. Note that the communication I/F 604 may be configured to be capable of executing wireless communication with the base station 113. The control unit 600 is a computer system that includes a processor 601, which integrally controls the operations inside the control unit 600, a memory 602, a notification control unit 603, and the communication I/F 604. The operations of the straddle type vehicle 114 according to the present embodiment are realized by, for example, the processor 601 executing a program on the memory 602. The notification control unit 603 requests the ECU 610 to control the notification unit 615 based on notification control data transmitted from the communication terminal 112. For example, the notification control unit 603 converts notification control data transmitted from the communication terminal 112 into a signal that can be processed by the ECU 610, and transmits the signal to the ECU 610. In the present embodiment, notification refers to processing for giving awareness to the rider of the straddle type vehicle 114, such as display on a panel, lighting of the lamp, vibration of handle bars, and so forth. For example, the notification control unit 603 converts notification control data for causing the lamp of the notification unit 615 to be displayed, and notification control data for causing handle bars of the steering unit 613 to vibrate, into signals that can be processed by the ECU 610, and transmits the signals to the ECU 610. Also, the control unit 600 can be connected to a storage unit 616, such as a USB. The straddle type vehicle 114 is not limited to the block configuration shown in FIG. 6A, and includes, for example, functional blocks corresponding to the functions of the straddle type vehicle 114 as appropriate. For example, the straddle type vehicle 114 may be configured to include a GPS that obtains GPS information of the straddle type vehicle 114, and a vehicle information transmission unit that can transmit the GPS information, speed information, and the like as vehicle information to the outside.

Figure 6B:
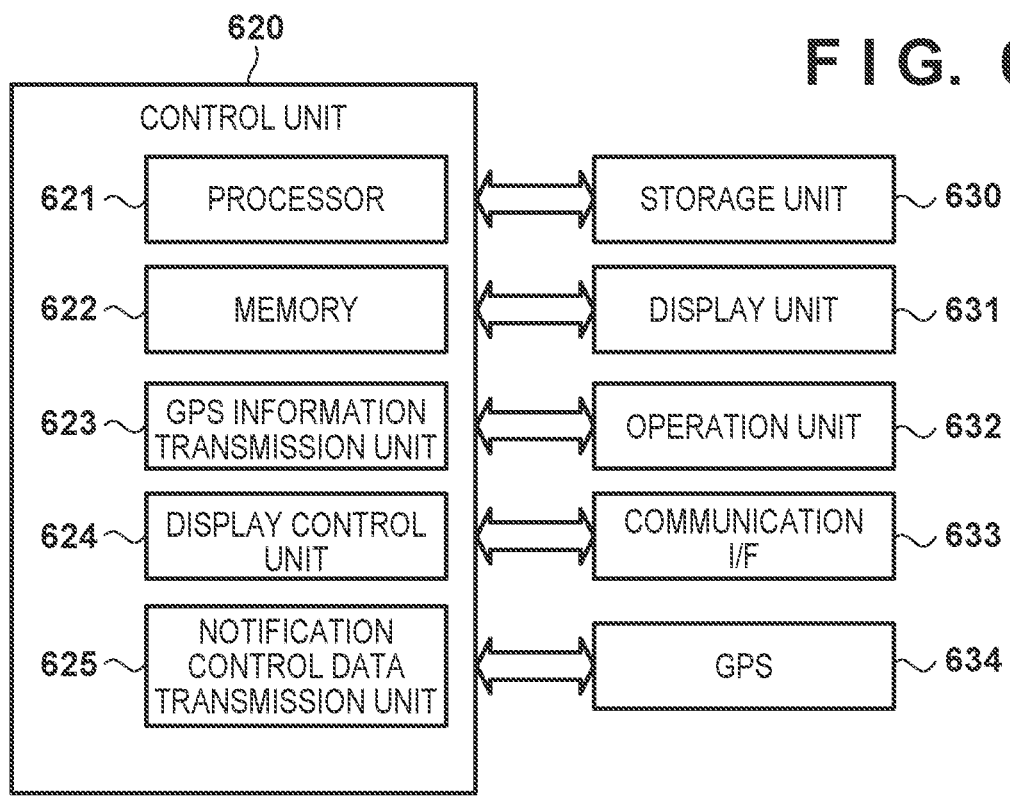

FIG. 6B is a diagram showing a block configuration of the communication terminal 112. A control unit 620 integrally controls the communication terminal 112. The control unit 620 is a computer system that includes a processor 621, which integrally controls the operations inside the control unit 620, and a memory 622. The operations of the communication terminal 112 according to the present embodiment are realized by, for example, the processor 621 executing a program on the memory 622. A GPS information transmission unit 623 transmits GPS information obtained by a GPS 634 to the outside via a communication I/F 633. A display control unit 624 controls display on a display unit 631. A notification control data transmission unit 625 generates notification control data to be used by the straddle type vehicle 114 based on notification control data transmitted from the outside, and transmits the generated notification control data to the straddle type vehicle 114 via the communication I/F 633. For example, notification control data is lighting control data for lighting the lamp included in the notification unit 615 of FIG. 6A, or data for giving visual/auditory notification to the helmet of the rider of the straddle type vehicle 114.

A storage unit 630 stores a program and data for the operations of the communication terminal 112, and a program and data necessary for the operations of the present embodiment. For example, an application provided by the server 101 is stored in the storage unit 630. For example, a user of the communication terminal 112 activates this application, and performs registration with the server 101 and pairing with the control unit 600 of the straddle type vehicle 114 on a setting screen. The display unit 631 is, for example, a touchscreen, and displays various types of user interface screens for the user of the communication terminal 112. Note, in the present embodiment, the user of the communication terminal 112 is equivalent to the rider of the straddle type vehicle 114. An operation unit 632 can accept user operations, and includes hardware keys and software keys displayed on the touchscreen. The GPS 634 is a position detection mechanism for detecting the current position of the communication terminal 112. The communication I/F 633 enables wireless communication with the outside. Note that the communication I/F 633 may be configured to be compatible with a plurality of wireless communications with different communication distances. The communication terminal 112 is not limited to the block configuration shown in FIG. 6B, and includes, for example, functional blocks corresponding to the functions of the communication terminal 112 as appropriate.

Although a vehicle corresponding to the communication terminal 112 is described as the straddle type vehicle 114 in the present embodiment, it may be another type of vehicle, such as a four-wheeled vehicle. In this case, an ECU of the four-wheeled vehicle and the control unit 620 of FIG. 6B may be configured in the four-wheeled vehicle in an integrated manner.

FIG. 8 is a flowchart showing processing executed by the server 101. Processing of FIG. 8 is executed by the server 101 in the case of the configuration of FIG. 1, but is executed by the vehicle 104 in the case of the configuration of FIG. 2 or FIG. 3. The following description will be provided under the assumption that this processing is executed by the server 101. Processing of FIG. 8 is realized by, for example, the processor 401 executing a program on the memory 402.

In step S101, with use of the captured image data obtainment unit 403, the processor 401 obtains captured image data. Here, the obtained captured image data is at least one of captured image data captured by the image capturing unit 105 of the building 102, captured image data captured by the image capturing unit 106 of the public equipment 103, and captured image data captured by the image capturing unit 107 of the vehicle 104.

In step S102, the processor 401 obtains environment information from the environment information 422. Here, the obtained environment information is, for example, weather information related to snowfall and the like, or roadway icing information. In step S103, the processor 401 makes a judgment about an obstruction factor.

Figure 9:
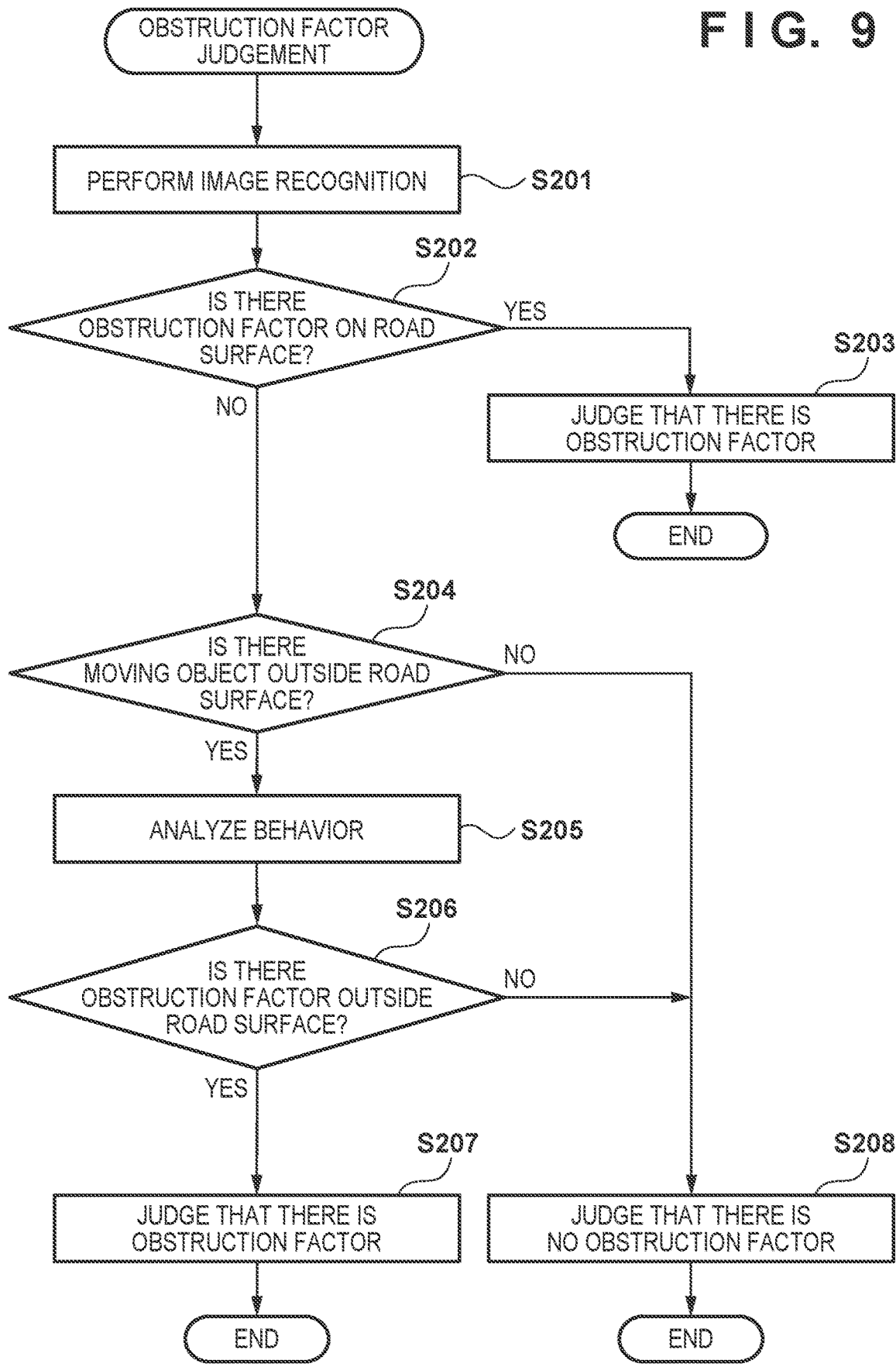
FIG. 9 is a flowchart of obstruction factor judgment processing of step S103.

FIG. 9 is a flowchart showing obstruction factor judgment processing of step S103. The processor 401 performs obstruction factor recognition with use of the image recognition unit 404 in step S201, and judges whether there is an obstruction factor on a road surface traveled by vehicles based on the result of recognition in step S201 with use of the judgment unit 405 in step S202. For example, a puddle or a dip on the traveled road surface is recognized and judged to be an obstruction factor based on changes in density and luminance in the captured image data. At this time, presumption based on the environment information obtained in step S102 may be used. When it is judged that there is an obstruction factor on the traveled road surface in step S202, processing proceeds to step S203, and the processor 401 judges that there is an obstruction factor with use of the judgment unit 405 and stores the result of this judgment into a storage area in the memory 402 and the like. Thereafter, processing of FIG. 9 is ended. On the other hand, when it is judged that there is no obstruction factor on the traveled road surface, processing proceeds to 204.

In step S204, with use of the judgment unit 405, the processor 401 judges whether there is a moving object outside the road surface traveled by vehicles, for example, on a sidewalk, based on the result of recognition in step S201. Here, the moving object is, for example, a bicycle, a pedestrian, and the like. When it is judged that there is no moving object outside the traveled road surface in step S204, processing proceeds to step S208, and the processor 401 judges that there is no obstruction factor with use of the judgment unit 405 and stores the result of this judgment into the storage area in the memory 402 and the like. Thereafter, processing of FIG. 9 is ended. On the other hand, when it is judged that there is a moving object outside the traveled road surface, processing proceeds to step S205.

In step S205, with use of the image recognition unit 404, the processor 401 analyzes the behavior of the moving object judged in step S204. For example, in step S205, the size of the moving object and the moving direction of the moving object are analyzed.

In step S206, with use of the judgment unit 405, the processor 401 judges whether there is an obstruction factor outside the road surface traveled by vehicles based on the result of analysis in step S205. For example, when it is presumed from the result of analysis in step S205 that the size of the moving object is equal to or larger than a predetermined value and the moving object is moving in a predetermined direction, it is judged that there is an obstruction factor outside the road surface traveled by vehicles. Here, the predetermined direction is, for example, a direction from the sidewalk toward the traveled road. When it is judged that there is an obstruction factor outside the traveled road surface in step S206, processing proceeds to step S207, and the processor 401 judges that there is an obstruction factor with use of the judgment unit 405 and stores the result of this judgment into the storage area in the memory 402 and the like. Thereafter, processing of FIG. 9 is ended. On the other hand, for example, when it is presumed from the result of analysis in step S205 that the size of the moving object is smaller than the predetermined value or the moving object is not moving in the predetermined direction, it is judged that there is no obstruction factor outside the road surface traveled by vehicles. When it is judged that there is no obstruction factor outside the traveled road surface in step S206, processing proceeds to step S208, and the processor 401 judges that there is no obstruction factor with use of the judgment unit 405 and stores the result of this judgment into the storage area in the memory 402 and the like. Thereafter, processing of FIG. 9 is ended.

In this way, for example, a small plastic bag that is moving while being blown away by the wind, or a pedestrian who is moving in a direction away from the traveled road surface, is not recognized as an obstruction factor; thus, an obstruction factor can be recognized appropriately.

Although processing of FIG. 9 is ended after step S203, processing of steps S204 to S208 may be performed after step S203. In this case, the result of judgment about whether there is a moving object outside the road surface is stored in such a manner that it can be identified from the result of judgment in step S203.

Reference is made to FIG. 8 again. After step S103, in step S104, with use of the judgment unit 405, the processor 401 judges whether there is an obstruction factor based on the results stored into the storage area of the memory 402 and the like in steps S203, S207, and S208 of FIG. 9. When it is judged that there is no obstruction factor, processing is repeated from step S101. On the other hand, when it is judged that there is an obstruction factor, processing proceeds to step S105.

In step S105, with use of the vehicle information obtainment unit 408, the processor 401 judges whether there is a vehicle in a predetermined range including this obstruction factor. For example, the processor 401 may judge whether there is a vehicle in a predetermined range centered at the obstruction factor based on GPS information transmitted from each vehicle. When it is judged that there is no vehicle in the predetermined range in step S105, processing of FIG. 8 is ended. On the other hand, when it is judged that there is a vehicle in the predetermined range, processing proceeds to step S106.

In step S106, with use of the vehicle information obtainment unit 408, the processor 401 obtains vehicle information of the vehicle that was judged to be present in the predetermined range. For example, a vehicle type, such as a four-wheeled vehicle and a straddle type vehicle, is obtained as the vehicle information.

In step S107, with use of the notification data generation unit 406, the processor 401 generates notification data. In the present embodiment, the processor 401 generates notification data in accordance with the vehicle type obtained in step S106. For example, when the vehicle type obtained in step S106 is a straddle type vehicle, the processor 401 generates notification data including a message that prompts avoidance, such as "There is a dip ahead. Please avoid.". On the other hand, when the vehicle type obtained in step S106 is a four-wheeled vehicle, the processor 401 generates notification data which gives notification of the presence of the obstruction factor but which does not include a message that prompts avoidance, such as "There is a dip ahead.". As a basis for variations in notification data depending on a vehicle type, for example, when the obstruction factor represents a state on the traveled road surface, such as a dip and icing, a message that not only indicates the presence of the obstruction factor but also prompts avoidance thereof may be added with respect to a straddle type vehicle. On the other hand, when the obstruction factor is a moving object outside the traveled road surface, a uniform message may be used irrespective of a vehicle type. Information of the foregoing basis may be stored in the storage unit 420 in advance.

In step S108, with use of the notification data transmission unit 407, the processor 401 transmits the notification data generated in step S107 to the vehicle that was judged to be present in step S105. Thereafter, processing of FIG. 8 is ended. The vehicle 111 or the communication terminal 112 that received the notification data gives notification to the rider based on the notification data. This notification may be, for example, displayed on the display apparatus 517 of the vehicle 111, or may be provided as speech from the speaker 516. Also, this notification may be displayed on the display unit 631 of the communication terminal 112. Furthermore, the communication terminal 112 may give notification to the rider by transmitting notification control data to the control unit 600 of the straddle type vehicle 114 ridden by the holder of the communication terminal 112 based on the notification data, and by controlling the driving unit 611, the braking unit 612, the steering unit 613, and the notification unit 615.

As described above, according to the present embodiment, even with the same obstruction factor, notification data of the obstruction factor varies depending on a vehicle type. With this configuration, for example, when the obstruction factor is a dip, a message that prompts avoidance is transmitted as notification data to a straddle type vehicle; this can prompt a rider thereof to avoid the obstruction factor. On the other hand, with respect to a four-wheeled vehicle, a message that notifies an occupant only of the presence of the dip is transmitted as notification data; this can prevent an excessive avoidance action.

Furthermore, although the present embodiment has been described using an example in which notification data varies between a four-wheeled vehicle and a straddle type vehicle, vehicles are not limited to the four-wheeled vehicle and the straddle type vehicle. For example, notification data may vary between, for example, a standard automobile and a large-sized special automobile, namely, depending on the size, the number of wheels, and the like thereof. In this case, information of these is obtained as vehicle information.

Furthermore, the present embodiment has been described under the assumption that notification data is transmitted to a vehicle that is present in a predetermined range including an obstruction factor. Here, notification data may not be transmitted to a vehicle to which notification data need not be transmitted. For example, when the obstruction factor is a dip, in a case where the size of this dip has been recognized to be equal to or smaller than a predetermined value, it may be judged that the degree of influence on traveling of a four-wheeled vehicle is extremely low, and notification data may not be generated with respect to a four-wheeled vehicle in step S107. This configuration can reduce the amount of communication.

Furthermore, in the present embodiment, in transmitting notification data in step S108 of FIG. 8, a transmission timing of the notification data may be controlled in accordance with a status of approaching of a vehicle to which the notification data is to be transmitted. For example, a moving speed is calculated from GPS information received from a target vehicle to which the notification data is to be transmitted, and the notification data is transmitted so that an occupant is notified of the notification data upon reaching a predetermined distance from an obstruction factor. This configuration can prevent, for example, a situation in which the obstruction factor cannot be avoided in time due to a delay in the timing of notification to the occupant.

Furthermore, in the description of the present embodiment, notification is given to an occupant based on notification data by, for example, displaying a message, providing a message as speech, or lighting the lamp. However, no limitation is intended by this example, and travel control for a vehicle, such as travel assistance operations, may be performed at the same time as when notification is given to the occupant. For example, an automatic brake may be actuated. In addition, the content of notification to the occupant based on notification data may be settable on an application of the server 101, in advance, before a user uses the travel assistance system 100.

Second Embodiment

The following describes a second embodiment with a focus on differences from the first embodiment. According to the description of the first embodiment, when an obstruction factor has appeared, notification data for notifying occupants of this obstruction factor varies depending on the types of respective vehicles located around, thereby giving notification to the occupants appropriately. A description is now given of the operations of the present embodiment with reference to FIG. 7B.

When the obstruction factor 707 has appeared, as described in the first embodiment, notification data for notifying the occupants of this obstruction factor is transmitted to the straddle type vehicle 701 and the four-wheeled vehicle 708. Here, the straddle type vehicle 701 is expected to change its travel course to the right side in order to avoid the obstruction factor 707. In this case, if the four-wheeled vehicle 708 has been originally planning to perform lane changing to the right side, the avoidance action of the straddle type vehicle 701, per se, can possibly become an obstruction factor for the four-wheeled vehicle 708. In view of this, in the present embodiment, together with information for notifying the occupant of the four-wheeled vehicle 708 of the obstruction factor 707, information indicating that the straddle type two-wheel vehicle 701 has a possibility of taking an avoidance action is transmitted to the four-wheeled vehicle 708.

Figure 10:
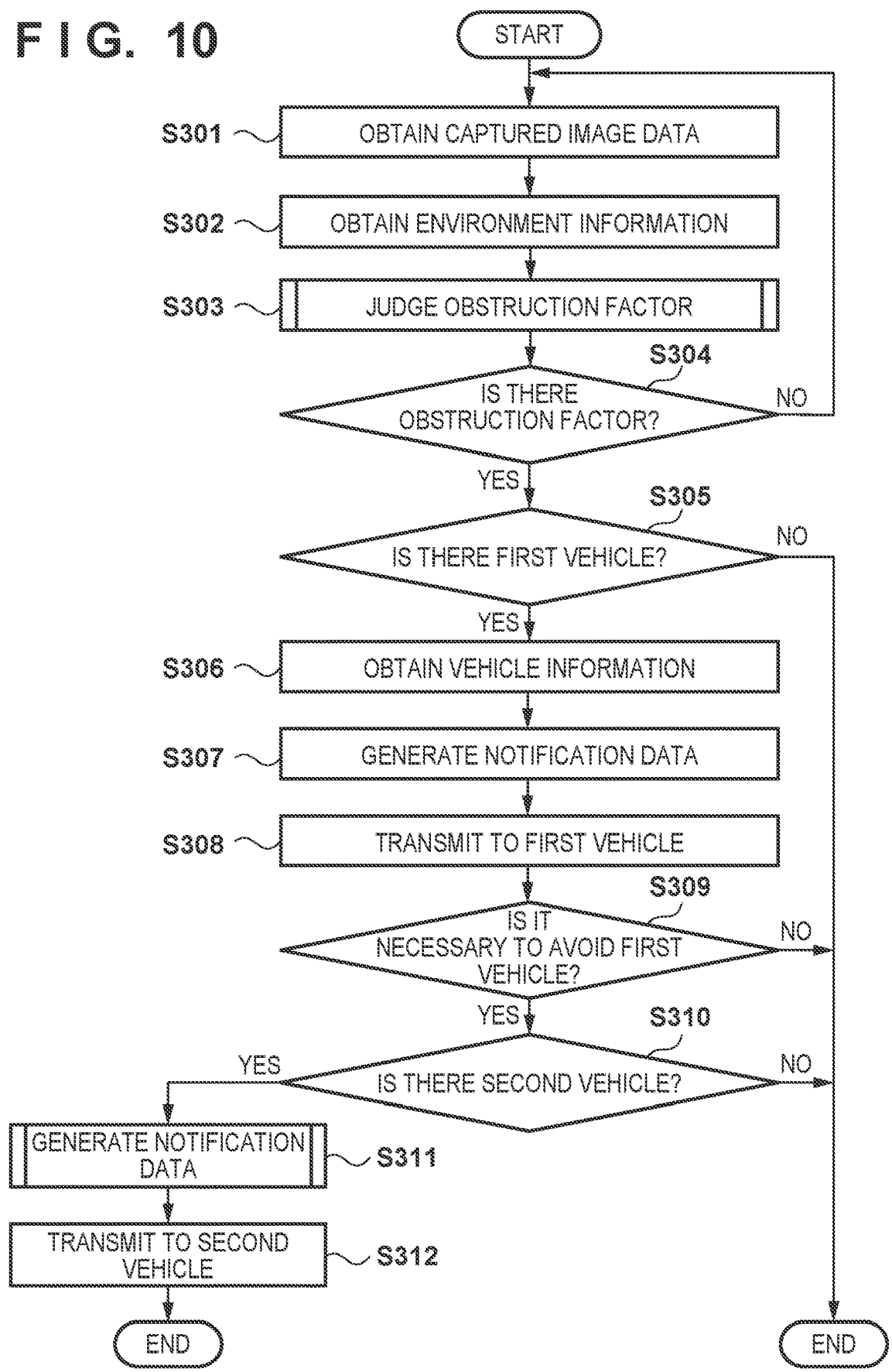
FIG. 10 is a flowchart showing processing executed by the server.

FIG. 10 is a flowchart showing processing executed by the server 101. Processing of FIG. 10 is executed by the server 101 in the case of the configuration of FIG. 1, but is executed by the vehicle 104 in the case of the configuration of FIG. 2 or FIG. 3. The following description will be provided under the assumption that this processing is executed by the server 101. Processing of FIG. 10 is realized by, for example, the processor 401 executing a program on the memory 402.

As steps S301 to S304 are the same as the description of steps S101 to S104 of FIG. 8, the description thereof is omitted.

In step S305, with use of the vehicle information obtainment unit 408, the processor 401 judges whether there is a vehicle in a first range including this obstruction factor. For example, the processor 401 may judge whether there is a vehicle in the first range centered at the obstruction factor based on GPS information transmitted from each vehicle. When it is judged that there is no vehicle in the first range in step S305, processing of FIG. 10 is ended. On the other hand, when it is judged that there is a vehicle in the first range, processing proceeds to step S306. In the present embodiment, the vehicle that was judged to be present in the first range is regarded as a first vehicle, and is equivalent to the straddle type vehicle 701 of FIG. 7B.

In step S306, with use of the vehicle information obtainment unit 408, the processor 401 obtains vehicle information of the vehicle that was judged to be present in the first range. Here, a vehicle type, such as a four-wheeled vehicle and a straddle type vehicle, is obtained as the vehicle information.

In step S307, with use of the notification data generation unit 406, the processor 401 generates notification data. Then, in step S308, with use of the notification data transmission unit 407, the processor 401 transmits the notification data generated in step S307 to the vehicle that was judged to be present in step S305.

In step S309, with use of the judgment unit 405, the processor 401 judges whether the first vehicle that was judged to be present in the first range in step S305 needs to avoid the obstruction factor 707. In step S309, the processor 401 may make the judgment based on information indicating pre-established association between information of the obstruction factor 707 and vehicle types. For example, when the size of the obstruction factor is within a predetermined range, the association may show that a straddle type vehicle needs avoidance whereas a four-wheeled vehicle does not need avoidance. When it is judged that the first vehicle does not need to avoid the obstruction factor in step S309, processing of FIG. 10 is ended. On the other hand, when it is judged that the first vehicle needs to avoid the obstruction factor, processing proceeds to step S310.

In step S310, with use of the vehicle information obtainment unit 408, the processor 401 judges whether there is a vehicle (second vehicle) in a second range including this obstruction factor 707. Here, the second range is set to be larger than the first range. That is to say, a vehicle located behind the first vehicle that was judged to be present in step S305, such as the vehicle 708 of FIG. 7B, is judged to be the second vehicle in step S308. When it is judged that there is no vehicle in the second range in step S309, processing of FIG. 10 is ended. On the other hand, when it is judged that there is a vehicle in the second range, processing proceeds to step S311.

In step S311, with use of the notification data generation unit 406, the processor 401 generates notification data to be transmitted to the second vehicle. Then, in step S312, with use of the notification data transmission unit 407, the processor 401 transmits the notification data generated in step S311 to the vehicle that was judged to be present in step S310.

Figure 11A:
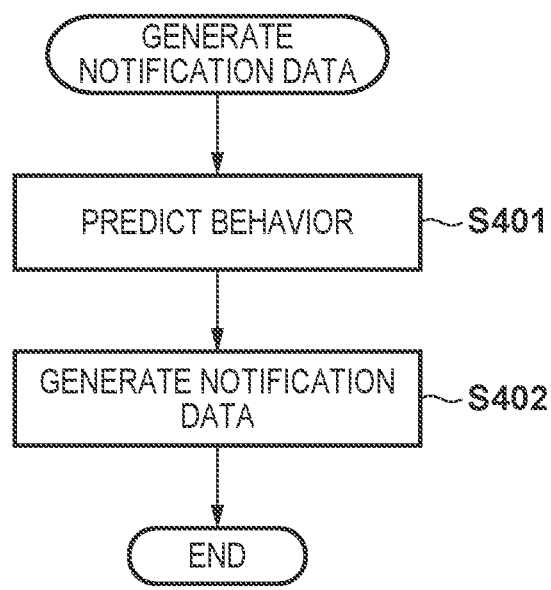
FIG. 11A and FIG. 11B are a flowchart showing notification data generation processing.

FIG. 11A is a flowchart showing notification data generation processing in step S311. In step S401, with use of the notification data generation unit 406, the processor 401 predicts the second vehicle's behavior to avoid the obstruction factor 707. For example, as the behavior prediction, an avoidance course is predicted. Then, in step S402, with use of the notification data generation unit 406, the processor 401 generates notification data to be transmitted to the second vehicle based on the behavior predicted in step S401. Thereafter, processing of FIG. 11A is ended.

Figure 11B:
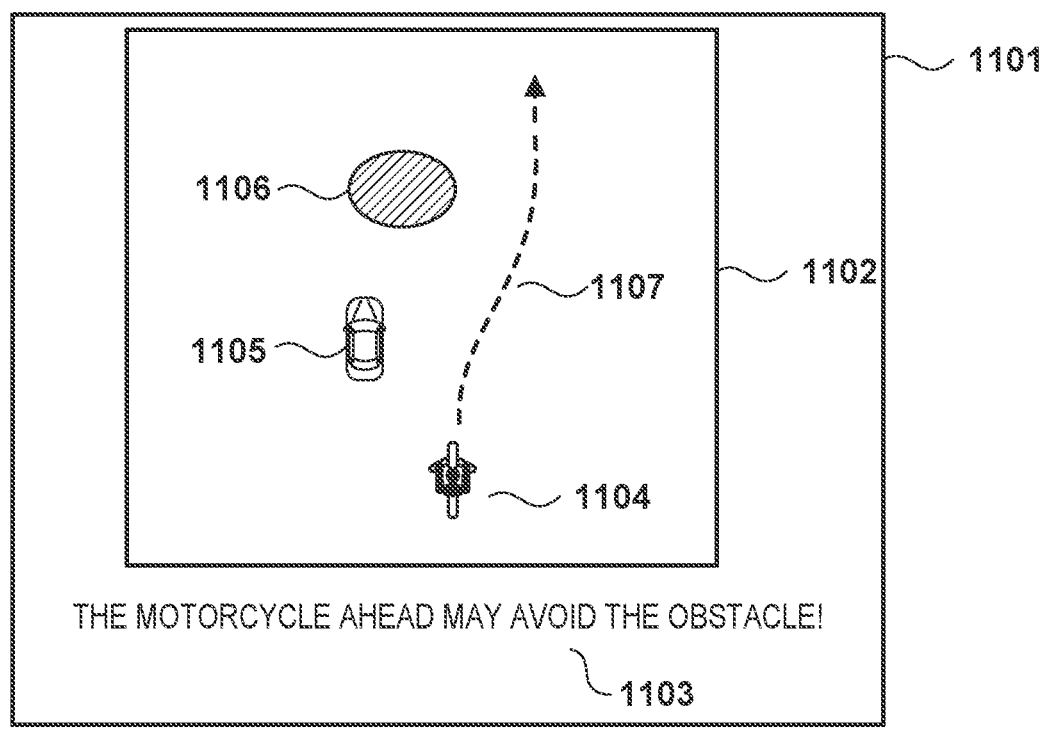

FIG. 11B is a diagram showing one example of a screen that is displayed on the display apparatus 517 based on the notification data generated in step S402. In a display region 1102 on a screen 1101 of FIG. 11B, images of vehicles located ahead of the second vehicle are displayed. An obstruction factor 1106 is the obstruction factor that was judged in step S303, and is equivalent to the obstruction factor 707 of FIG. 7B. A vehicle 1105 is equivalent to the vehicle 702 of FIG. 7B. A vehicle 1104 is the first vehicle that was judged to be present in the first range in step S305, and is equivalent to the vehicle 701 of FIG. 7B. A course 1107 is the obstruction factor avoidance course of the second vehicle predicted in step S401. A display region 1103 displays a message indicating the possibility that the vehicle ahead takes an avoidance action, namely "The motorcycle ahead may avoid the obstacle!". A word corresponding to the vehicle type of the vehicle 1104 is inserted in the portion "motorcycle" in the foregoing message.

Displaying the screen 1101 of FIG. 11B makes it possible to notify the occupant of the second vehicle traveling behind the first vehicle of the avoidance action taken by the first vehicle ahead.

As described above, according to the present embodiment, the occupant of the second vehicle traveling behind the first vehicle, which was judged to be in need for avoidance of the obstruction factor, can be notified of the possibility of the avoidance action of the first vehicle. This configuration can prevent a situation in which the avoidance action of the first vehicle becomes an unexpected, sudden action for the occupant of the second vehicle.

Third Embodiment

The following describes a third embodiment with a focus on differences from the first and second embodiments. According to the description of the first embodiment, when an obstruction factor has appeared, notification data for notifying occupants of this obstruction factor varies depending on the types of respective vehicles located around, thereby giving notification to the occupants appropriately. According to the present embodiment, notification data including information of the obstruction factor is transmitted uniformly irrespective of the types of respective vehicles. Then, the vehicle 111 or the communication terminal 112 that has received the notification data determines the degree of connection between the information of the obstruction factor and the self-vehicle; notification is given when it is judged that the occupant needs to be notified of the data, and notification is not given when it is judged that the occupant need not be notified of the data. This configuration can reduce a processing load on the transmitting side of the notification data.

As described in the first embodiment, FIG. 3 differs from FIG. 2 in that the control units 121, 122 are configured in the vehicle 111 and the terminal 112. The control units 121, 122 are computer systems that include a processor and a memory; the control unit is a controller including, for example, an ECU in the case of the vehicle, and is a controller including, for example, a CPU in the case of the communication terminal 112. In FIG. 3, the control unit 121 of the vehicle 111 and the control unit 122 of the communication terminal 112 make a determination about the connection between information of an obstruction factor transmitted from the vehicle 104 and the self-vehicle, and give notification to occupants based on the result of this determination.

FIG. 12 is a flowchart showing processing executed by the vehicle 111 or the terminal 112 that has received notification data. Processing of FIG. 12 is executed by, for example, the control unit 121 of the vehicle 111 and the control unit 122 of the terminal 112 of FIG. 3. Although this processing is described hereinafter as being executed by the control unit 121, the same goes for a case where this processing is executed by the control unit 122. Also, processing of FIG. 12 is executed after notification data is transmitted in step S108 of FIG. 8. Note that in step S107 of FIG. 8, unlike the first embodiment, information of the obstruction factor 707 is uniformly generated as notification data irrespective of the types of respective vehicles. The information of the obstruction factor 707 includes, for example, the size of the obstruction factor 707 and whether there is a moving object. Information indicating whether there is a moving object may be generated, for example, based on the result of execution of processing of steps S204 to S208 after step S203 in processing of FIG. 9.

In step S501, the control unit 121 judges whether notification data has been received. Step S501 is repeated until it is judged that the notification data has been received. When it is judged that the notification data has been received, processing proceeds to step S502.

In step S502, the control unit 121 determines the degree of connection between the received notification data and the self-vehicle based on the information of the obstruction factor 707. For example, when the size of the obstruction factor 707 is included in a predetermined range that requires notification to the occupant, the control unit 121 judges that the degree of connection is high. This predetermined range varies depending on a vehicle type; for example, a region of a predetermined range smaller than a threshold may be set as a predetermined range with a size that requires notification to the rider in the case of a straddle type vehicle, whereas a predetermined range equal to or larger than the threshold may be set as a predetermined range with a size that request notification to the occupant in the case of a four-wheeled vehicle. Also, the degree of connection is determined to be high when, for example, it is determined that the course of movement of the self-vehicle and the course of movement of a moving object outside the road surface toward the traveled road will intersect each other at a high degree of certainty as the self-vehicle approaches.

In step S503, the control unit 121 determines whether notification to the occupant is required based on the degree of connection determined in step S502. When it is determined that the degree of connection is high in step S502 and it is determined that notification to the occupant is required in step S503, processing proceeds to step S504, and notification is given to the occupant based on the notification data. This notification may be, for example, displayed on the display apparatus 517 of the vehicle 111, or may be provided as speech from the speaker 516. Also, this notification may be displayed on the display unit 631 of the communication terminal 112 when the communication terminal 112 has received the notification data. In this case, the communication terminal 112 may give notification to the occupant by transmitting notification control data to the control unit 600 of the straddle type vehicle 114 ridden by the holder of the communication terminal 112 based on the notification data, and by controlling the driving unit 611, the braking unit 612, the steering unit 613, and the notification unit 615. Thereafter, processing of FIG. 12 is ended. On the other hand, when it is judged that notification to the occupant is not required in step S503, processing of FIG. 12 is ended.

As described above, according to the present embodiment, whether it is required to give notification based on notification data is determined on the receiving side of this notification data. This configuration can reduce a processing load on the transmitting side of the notification data.

In generating the notification data in step S107, information indicating whether it is necessary to give notification to the occupant may be generated together in accordance with a vehicle type, and the notification data including this information may be transmitted in step S108. The information indicating whether it is necessary to give notification to the occupant is generated for each of the types of respective vehicles based on, for example, the size of the obstruction factor 707 and the types of respective vehicles. Then, in step S502, the control unit 121 determines that the degree of connection with the self-vehicle is high when the information indicating the necessity of notification to the occupant shows "notification is required". By thus generating and transmitting the notification data that enables the receiving side to identify whether notification to the occupant is required, processing for determining the degree of connection with the self-vehicle on the receiving side can be further simplified.

Summary of Embodiments

A travel assistance system according to the aforementioned embodiments is a travel assistance system including a server that assists traveling of a vehicle, the travel assistance system including: a recognition unit (404) configured to recognize an obstruction factor for traveling of the vehicle; an obtainment unit (408) configured to obtain information of an approaching vehicle that approaches the obstruction factor; a generation unit (406) configured to, based on information of the obstruction factor recognized by the recognition unit, generate warning information corresponding to information of a type of the approaching vehicle obtained by the obtainment unit; a transmission unit (407) configured to transmit the warning information to the approaching vehicle; and a control unit configured to give notification to an occupant of the approaching vehicle and/or control traveling of the approaching vehicle based on the warning information.

This configuration makes it possible to, for example, give notification of appropriate obstruction information in accordance with a type of a vehicle approaching the obstruction factor. Furthermore, the generation unit judges that a size of the obstruction factor is equal to or larger than a predetermined value or is equal to or smaller than the predetermined value, and generates warning information corresponding to a vehicle model of the approaching vehicle in accordance with a result of the judgment.

This configuration makes it possible to perform control so that, for example, the content of notification data varies between a straddle type vehicle and a four-wheeled vehicle that approach the obstruction factor, and the notification data is not transmitted to one of these vehicles.

Furthermore, this configuration makes it possible to, for example, additionally warn the straddle type vehicle of the necessity of an avoidance operation when a dip on a road has a diameter equal to or larger than the predetermined value.

A control determination unit configured to, based on the warning information, make at least one of a judgment about whether to perform control by the control unit and a determination about a content of the control, is further included; the control determination unit evaluates a degree of connection between the information of the obstruction factor and the approaching vehicle, and makes at least one of the judgment about whether to perform the control by the control unit and the determination about the content of the control based on a result of the evaluation.

This configuration makes it possible to, for example, judge whether to give notification to the occupant of the approaching vehicle based on the warning information.

Furthermore, the approaching vehicle includes a first approaching vehicle and a second approaching vehicle that is located behind the first approaching vehicle, and when the first approaching vehicle is predicted to avoid the obstruction factor, the transmission unit transmits warning information including an avoidance course of the first approaching vehicle to the second approaching vehicle.

This configuration makes it possible to, for example, notify an approaching vehicle of the possibility that a straddle type vehicle ahead of the approaching vehicle avoids the obstruction factor.

The invention is not limited to the foregoing embodiments, and various variations/changes are possible within the spirit of the invention.

What is claimed is:

1. A travel assistance system including a vehicle and a server which is provided outside the vehicle, comprising:
   a camera configured to recognize an obstruction factor for traveling of the vehicle, using captured data;
   a first processor of the server configured to obtain information of an approaching vehicle that approaches the obstruction factor;
   wherein the first processor is configured to generate warning information, based on information of the obstruction factor, corresponding to information of a type of the approaching vehicle obtained by the first processor, and the first processor is configured to transmit the warning information to the approaching vehicle;
   a second processor of the approaching vehicle configured to give notification to an occupant of the approaching vehicle and/or control traveling of the approaching vehicle based on the warning information,
   wherein the approaching vehicle includes a first approaching vehicle and a second approaching vehicle that is located behind the first approaching vehicle; and
   the first processor of the server is further configured to predict an avoidance course of the first approaching vehicle with respect to a first obstruction factor based on information of a type of the first approaching vehicle, the first processor is configured to generate first warning information and transmit the generated first warning information to the first approaching vehicle, and the first processor is further configured to generate second warning information including the first obstruction factor, the predicted avoidance course with respect to the first obstruction factor of the first approaching vehicle as a second obstruction factor, and a message indicating that the first approaching vehicle may avoid the first obstruction factor, and the first processor is further configured to transmit the generated second warning information to the second approaching vehicle,
   in a case where the second processor of the second approaching vehicle gives notification to the occupant of the second approaching vehicle, the second processor of the second approaching vehicle displays, based on the transmitted second warning information, an image showing a positional relationship between the first obstruction factor and the first approaching vehicle, the predicted avoidance course of the first approaching vehicle with respect to the first obstruction factor, and the message.

2. The travel assistance system according to claim 1, wherein the first processor is further configured to judge that a size of the obstruction factor is equal to or larger than a predetermined value or is equal to or smaller than the predetermined value, and generate warning information corresponding to a vehicle model of the approaching vehicle in accordance with a result of the judgment.

3. The travel assistance system according to claim 1, wherein
   the second processor is further configured to, based on the warning information, make at least one of a judgment about whether to perform control by the second processor and a determination about a content of the control,
   wherein the second processor is configured to evaluate a degree of connection between the information of the obstruction factor and the approaching vehicle, and makes at least one of the judgment about whether to perform the control by the second processor and the determination about the content of the control based on a result of the evaluation.

4. The travel assistance system according to claim 2, wherein
   the second processor is further configured to, based on the warning information, make at least one of a judgment about whether to perform control by the second processor and a determination about a content of the control,
   wherein the second processor is configured to evaluate a degree of connection between the information of the obstruction factor and the approaching vehicle, and makes at least one of the judgment about whether to perform the control by the second processor and the determination about the content of the control based on a result of the evaluation.

5. A travel assistance method to be executed in a travel assistance system including a vehicle and a server which is provided outside the vehicle, comprising:
   recognizing an obstruction factor for traveling of the vehicle, by using a camera;
   obtaining information of an approaching vehicle from the approaching vehicle that approaches the obstruction factor, by using a first processor of the server;
   generating, based on information of the recognized obstruction factor, warning information corresponding to information of a type of the approaching vehicle obtained in the obtaining;
   transmitting the warning information to the approaching vehicle; and
   giving notification to an occupant of the approaching vehicle and/or controlling traveling of the approaching vehicle based on the warning information, by using a second processor of the approaching vehicle,
   wherein the approaching vehicle includes a first approaching vehicle and a second approaching vehicle that is located behind the first approaching vehicle; and
   the first processor of the server is further configured to predict an avoidance course of the first approaching vehicle with respect to a first obstruction factor based on information of a type of the first approaching vehicle, the first processor generating first warning information and transmitting the generated first warning information to the first approaching vehicle, and the first processor is further configured to generate second warning information including the first obstruction factor, the predicted avoidance course with respect to the first obstruction factor of the first approaching vehicle as a second obstruction factor, and a message indicating that the first approaching vehicle may avoid the first obstruction factor, and the first processor is further configured to transmit the generated second warning information to the second approaching vehicle, in a case where the second processor of the second approaching vehicle gives notification to the occupant of the second approaching vehicle, the second processor of the second approaching vehicle displays, based on the transmitted second warning information, an image showing a positional relationship between the first obstruction factor and the first approaching vehicle, the predicted avoidance course of the first approaching vehicle with respect to the first obstruction factor, and the message.

6. A non-transitory computer-readable storage medium storing a program for causing a server which is provided outside a vehicle to execute to:

recognize an obstruction factor for traveling of the vehicle, by using a camera;

obtain information of an approaching vehicle from the approaching vehicle that approaches the obstruction factor, by using a first processor of the server;

generate, based on information of the recognized obstruction factor, warning information corresponding to information of a type of the approaching vehicle obtained in the obtaining;

transmit the warning information to the approaching vehicle; and give notification to an occupant of the approaching vehicle and/or control traveling of the approaching vehicle based on the warning information, by using a second processor of the approaching vehicle, wherein the approaching vehicle includes a first approaching vehicle and a second approaching vehicle that is located behind the first approaching vehicle; and the first processor of the server is further configured to predict an avoidance course of the first approaching vehicle with respect to a first obstruction factor based on information of a type of the first approaching vehicle, the first processor generating first warning information and transmitting the generated first warning information to the first approaching vehicle, and the first processor is further configured to generate second warning information including the first obstruction factor, the predicted avoidance course with respect to the first obstruction factor of the first approaching vehicle as a second obstruction factor, and a message indicating that the first approaching vehicle may avoid the first obstruction factor, and the first processor is further configured to transmit the generated second warning information to the second approaching vehicle, in a case where the second processor of the second approaching vehicle gives notification to the occupant of the second approaching vehicle, the second processor of the second approaching vehicle displays, based on the transmitted second warning information, an image showing a positional relationship between the first obstruction factor and the first approaching vehicle, the predicted avoidance course of the first approaching vehicle with respect to the first obstruction factor, and the message.

7. The travel assistance system according to claim 1, wherein the camera is provided in at least one of a building, a public equipment, or a vehicle.

8. The travel assistance system according to claim 1, wherein a communication terminal held by an occupant of the approaching vehicle is used as the second processor.

* * * * *